July 18, 1950   C. G. NEWTON   2,515,418
GAUGE FOR SMALL SCREW THREADS
Filed June 29, 1946
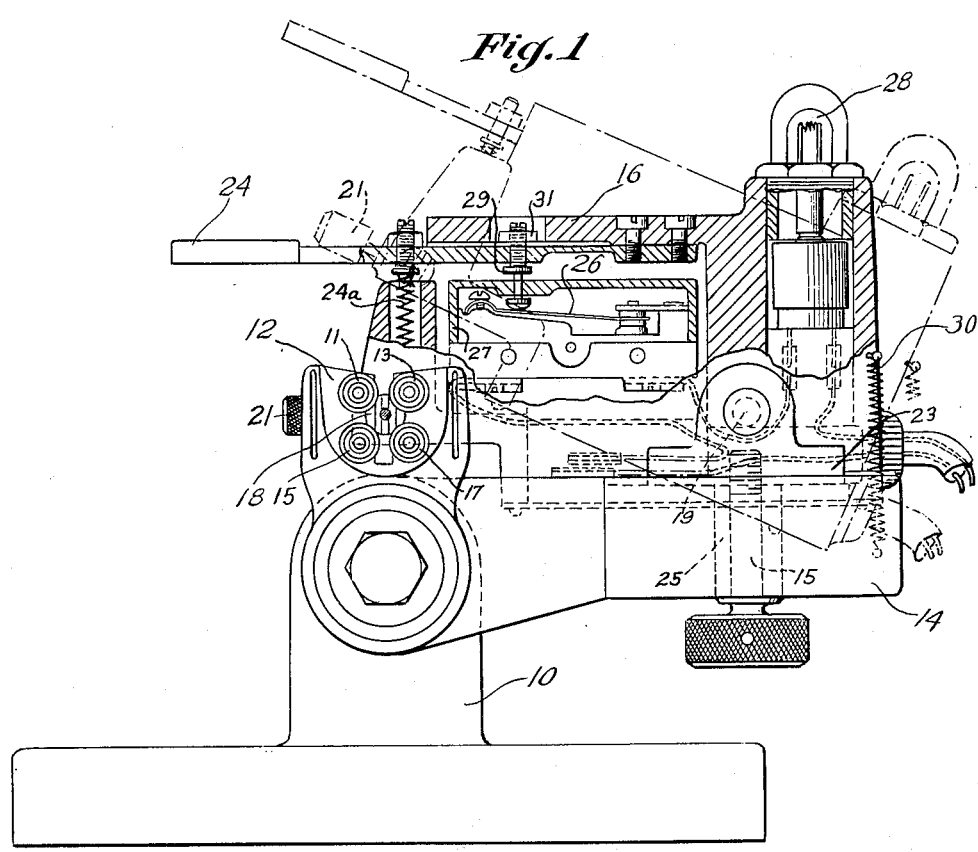
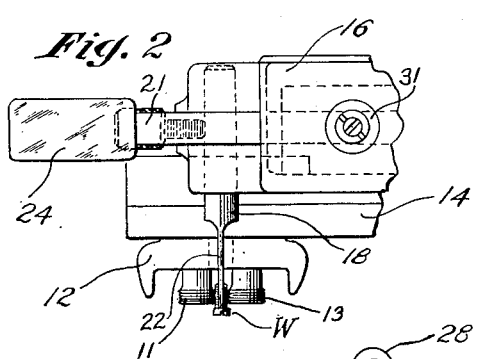
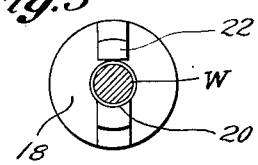
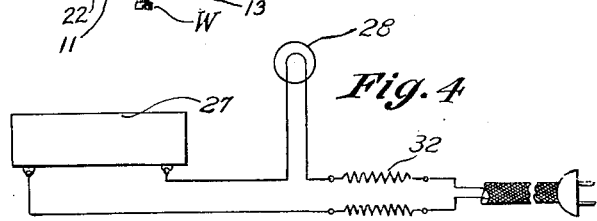
INVENTOR
C. G. Newton
BY
Joseph K. Schofield
ATTORNEY Patented July 18, 1950

2,515,418

UNITED STATES PATENT OFFICE 2,515,418

GAUGE FOR SMALL SCREW THREADS

Chauncey G. Newton, Rochester, N. Y., assignor to Niles-Bement-Pond Company, West Hartford, Conn., a corporation of New Jersey Application June 29, 1946, Serial No. 680,433

3 Claims. (Cl. 33—199)

1

This invention relates to dimension gages and particularly to a screw thread gage adapted to quickly and accurately gage short external screw threads of small diameter.

A primary object of the invention is to provide means to resiliently retain a threaded work piece being gaged in position within a holder, the holder and work piece being mounted for movement between opposed work contacting members of the gage.

A feature that enables this object to be accomplished is that a work piece support is pivotally mounted adjacent the gage, which may be of standard snap gage type, the pivotal support having a work retaining arm outstanding therefrom between the forked ends of which the work piece being gaged may be resiliently retained, the pivotally mounted member being manually moved to guide the work piece supported at the end of the arm between the work contacting members of the gage.

Another object of the invention is to provide a pressure controlled switch on the work supporting member so that when a predetermined pressure is required to move the supporting member to pass a work piece between the gaging members during the gaging operation a signal such as a small light will be operated.

Another feature that is advantageous in this connection is that the pressure operated switch is controlled by the manual means or handle made use of to oscillate the pivotally supported work piece to support and guide the work piece when moved during the gaging operation between the work contacting members of the gage.

With the above and other objects in view, the invention consists in the features of construction and operation set forth in the following specification and illustrated in the accompanying drawing.

In the accompanying drawing annexed hereto and forming a part of this specification, the invention is shown embodied in a manually operated screw thread gage for small threaded members, but it will be understood that the invention can be otherwise embodied and that the drawings are not to be construed as defining or limiting the scope of the invention, the claims appended to this specification being relied upon for that purpose.

In the drawing:

Figure 1 is a side elevation, partly in section, of a complete gage made in accordance with the present invention.

2

Fig. 2 is a plan view of a portion of the gage shown in Fig. 1.

Fig. 3 is a detail end view of a form of work piece retaining member on an enlarged scale, and Fig. 4 is a diagram of the signal operating circuit.

Briefly, and in its broadest aspect, the invention may comprise: First, a base on which is mounted a standard form of screw thread snap gage; second, a pivotally mounted member on the said base having a work retaining arm outstanding therefrom; third, a pressure operated switch on the pivotally mounted member; and fourth, a signal controlled by operation of the pressure switch.

Referring more in detail to the figures of the drawing, it will be seen that a base or platform 10 is provided on which is adjustably mounted a screw thread snap gage 12 of the well-known Johnson snap type, this gage preferably having two pairs of opposed freely rotatable annularly grooved rolls between which the threaded work piece W being gaged may be passed. A gage of this type is shown in Patent No. 1,660,335 granted February 28, 1928. The first or outer pair of work contacting rollers 11—13 is so adjusted that a work piece of full size but not oversize will pass between them, but if it is undersize, it will also pass through a second or lower pair of rolls 15—17, which are so adjusted that they will not permit any work piece too large to pass inspection to pass through. A member W being gaged is within specifications only if it passes between the first pair of rolls 11—13 but does not pass between the second pair 15—17.

At one side of this gage 12 is a bracket 14 rigidly fixed in position relative to the base 10 and having a pivotally mounted member 16 mounted thereon. The gage 12 is mounted on this bracket in a manner permitting ready substitution of different gages. Supported transversely within this member 16 and suitably fixed thereon is a horizontally extending cylindrical arm 18, the outer end portions of which are milled off on opposite sides and forked so that the gap between the forked ends will permit a work piece W to be resiliently retained in position. It will be noted by reference to the enlarged end view of this member 18 that the work piece W contacting surfaces of the forked end retain the work piece within a concave or curved surface on the lower fork 20 and the upper fork 22 is provided with a flat or plane surface contacting the upper surface of the work piece. The cylindrical rod or arm 18 is, as shown, extremely thin where milled off so that it is of less thickness than the root diameter of the screw threads being gaged. The work piece supported between these forked ends of arm 18 therefore will enter the gap between the gaging rolls 11—13 and 15—17 or other contacting members of the gage. This work retainer or arm 18 is, as shown, mounted detachably but fixedly as by a screw 21 within the pivotally mounted member 16 so that substitute retaining members 18 may be easily changed to adapt the gage for a wide variety of screw threads.

To adjust the position of the axis or pivot 19 about which the member 16 oscillates, a clamping screw 15 is provided to clamp the pedestal 23 for the member 16 in any adjusted position along the arm 14 so that the work holder 18 may be located accurately relative to the particular gage 12 being used. For this purpose the arm 14 is provided with an elongated slot 25 through which clamping screw 15 extends.

In order to oscillate this pivotally mounted member 16 about its pivot 19 in the bracket 14 to present the work piece between the gaging members, a flexible arm or handle 24 is mounted resiliently therein as by means of a thin flexible intermediate section. This handle 24 may be resiliently forced in one direction as by a spring 24a attached to member 16. Movements of this arm 24 relative to the pivotally supported member 16 are limited by any appropriate stops 29 and 31 as shown. Also mounted on this pivotally supported member 16 is a pressure operated switch 26 of any conventional or standard type so that when a predetermined pressure is exceeded in passing the work piece W through the space between the gaging members 11—13 and 15—17 by depressing handle 24, the handle will be resiliently moved further downward and will operate the pressure operated switch 26. Associated with the switch is a signal light 28 or other electrically operated signal means so that when the switch 26 controlled by movement of the resilient handle 24 relative to the member 16 is actuated the light 28 preferably will be extinguished by opening its normally closed circuit.

In operation it is only necessary to insert a work piece W to be gaged within the forked end of the work supporting arm 18 whereby it will be retained in alinement with the axis of the arm 18. By means of the handle 24 the pivotally supported member 16 is then manually oscillated downward. In the event that the member W being gaged is oversize and will not pass through the gap between the first pair of rollers 11—13, the resilient handle 24 will move relative to the pivotally mounted member 16 and actuate the switch 26 to either light or extinguish the signal bulb 28. The pressure necessary to operate this switch may be adjusted as desired and the position of the work contacting members of the gage 12 may be so spaced that a member W within the desired tolerances will pass through the first pair of rolls 11—13 without operating the pressure switch 26 and without lighting or extinguishing the signal bulb 28. The second pair of rolls 15—17 will be so set that if the gage piece W is properly made the work piece will not pass the second pair of gaging members and the arm 24 will therefore be resiliently disposed relative to the pivotally supported member 16 and the switch 26 will be operated to affect the bulb 28.

Normally, a light spring 30 holds the pivotal member 16 in inoperative or upper position and the movement of the handle 24 relative to the pivotal member 16 requires a greater pressure to operate the switch lever 26 than that necessary to overcome the pressure of spring 30 and move member 16.

A simple circuit is shown for the signal bulb 28 in Fig. 4. The bulb 28 may be adapted for a lower voltage than the available source so that resistances 32 are provided. Also the switch 26 may be so mounted that normally its circuit is closed and the light 28 is on when no pressure is applied to the handle 24 sufficient to deflect it relative to the pivotal member 16. As soon, however, as handle 24 is moved relative to the member 16, lever 26 within the switch housing 27 is moved to open the switch contacts.

I claim:
1. A gage comprising in combination, a base, a pair of work contacting gaging rolls mounted thereon, a pivotally mounted member on said base, a work piece retainer on said member adapted to support the work piece in position for movement between said rolls when said member is actuated, a pressure operated switch on said member, and a signal operating circuit closed by operation of said switch, said signal being operated by the pressure of said member necessary to move work pieces between said rolls.

2. A gage comprising in combination, a base, a pair of work contacting gaging rolls mounted on fixed axes thereon, a pivotally mounted member on said base, a work piece retainer on said member adapted to resiliently support the work piece with its axis in parallel relation to the axes of said rolls when said member is actuated, a pressure operated switch on said member, and a signal operating circuit closed by operation of said switch, said signal being operated by the pressure of said member necessary to move work pieces between said rolls.

3. A screw thread gage comprising in combination, a base, a pair of annularly grooved work contacting rolls mounted thereon, a pivotally mounted member on said base, a work piece retainer on said member adapted to support a work piece in position for movement between the rolls when said member is actuated, a resilient handle on said member, a pressure operated switch mounted on said member, and a signal operating circuit closed by resilient movement of said handle relative to said pivotally mounted member.

CHAUNCEY G. NEWTON.

REFERENCES CITED

The following references are of record in the file of this patent:

UNITED STATES PATENTS

| Number | Name | Date |
|---|---|---|
| 1,645,118 | Seabright | Oct. 11, 1927 |
| 1,851,283 | Johnson | Mar. 29, 1932 |
| 2,345,867 | Du Pont et al. | Apr. 4, 1944 |